(12) United States Patent
Naserian et al.

(10) Patent No.: US 12,157,416 B2
(45) Date of Patent: Dec. 3, 2024

(54) SYSTEM AND METHOD FOR ENHANCING OCCUPANT AWARENESS

(71) Applicant: GM Global Technology Operations LLC, Detroit, MI (US)

(72) Inventors: Mohammad Naserian, Windsor (CA); Allan Kenneth Lewis, Windsor (CA); Apral Singh Hara, LaSalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 18/066,458

(22) Filed: Dec. 15, 2022

(65) Prior Publication Data
US 2024/0198909 A1      Jun. 20, 2024

(51) Int. Cl.
*B60R 1/26*      (2022.01)

(52) U.S. Cl.
CPC ........ *B60R 1/26* (2022.01); *B60R 2300/8066* (2013.01)

(58) Field of Classification Search
CPC ..... B60R 2300/808; B60R 1/00; B60R 1/003; B60R 11/04; B60R 2300/105; B60R 2300/607; B60R 2300/806; B60R 2300/30; B60R 2300/303; B60R 2300/20; B60R 2300/305; B60R 2300/8086; B60R 2300/8066; B60R 2300/8093; B60R 2011/004; B60R 2300/10; B60R 2300/307; B60R 1/002; B60D 1/36; B60D 1/06; B60D 1/62; B60D 1/245; B60D 1/065; B62D 13/06; B62D 15/0285; B62D 15/025; B62D 15/027; G06T 2207/30252; G06T 7/70; G06T 7/73; G06T 7/60; G06T 2207/10016; B60W 10/20;
(Continued)

(56) References Cited

U.S. PATENT DOCUMENTS

| 3,069,654 | A | 12/1962 | Hough |
| 7,038,577 | B2 * | 5/2006 | Pawlicki ............ B60W 30/143 |
| | | | 340/436 |

(Continued)

OTHER PUBLICATIONS

Canny, J. "A Computational Approach to Edge Detection," IEEE Transactions on Pattern Analysis and Machine Intelligence, vol. PAMI-8, No. 6, Nov. 1986, pp. 679-698.

*Primary Examiner* — Christopher S Kelley
*Assistant Examiner* — Asmamaw G Tarko
(74) *Attorney, Agent, or Firm* — Vivacqua Crane, PLLC

(57) ABSTRACT

A system for enhancing occupant awareness for a vehicle includes a camera system for capturing images of an environment surrounding the vehicle, a display for displaying information to the occupant of the vehicle and a controller in electrical communication with the camera system and the display. The controller is programmed to determine an activation state of the system. The controller is further programmed to capture an image of the environment surrounding the vehicle using the camera system in response to determining that the activation state is the activated state. The image has a first portion and a second portion. The first portion of the image includes a trailer connected to the vehicle and the second portion of the image. The controller is further programmed to display the second portion of the image to the occupant using the display based at least in part on the first portion of the image.

20 Claims, 6 Drawing Sheets

(58) Field of Classification Search
CPC ....... B60W 2420/42; B60W 30/18036; B60W 50/14; B60W 10/18; B60W 2050/146; B60W 2300/14; B60W 10/04; G05D 2201/0213; G05D 1/0246; G05D 1/0225; G05D 1/0212
USPC ........ 348/148, 113, 118, 207.99; 701/36, 28
See application file for complete search history.

(56) References Cited

U.S. PATENT DOCUMENTS

| | | | | |
|---|---|---|---|---|
| 7,855,755 | B2* | 12/2010 | Weller | G02F 1/133385 |
| | | | | 349/1 |
| 9,154,746 | B2* | 10/2015 | Kageta | H01R 13/6691 |
| 9,452,722 | B2* | 9/2016 | Weigert | H01F 38/14 |
| 10,373,378 | B2* | 8/2019 | Harbach | G06F 3/1423 |
| 10,434,945 | B2* | 10/2019 | Loehr | G06T 19/006 |
| 10,701,300 | B2* | 6/2020 | Greenwood | B60R 1/26 |
| 2013/0107045 | A1* | 5/2013 | Soderlind | B60R 1/04 |
| | | | | 348/148 |
| 2017/0080928 | A1* | 3/2017 | Wasiek | B60W 50/14 |
| 2017/0129405 | A1* | 5/2017 | Oba | B60R 1/12 |
| 2017/0334355 | A1* | 11/2017 | Hubbell | G01S 13/931 |
| 2019/0016264 | A1* | 1/2019 | Potnis | G06N 3/08 |
| 2019/0084477 | A1* | 3/2019 | Gomez-Mendoza | G06T 7/55 |
| 2019/0184900 | A1* | 6/2019 | Lang | H04N 5/2628 |
| 2019/0329821 | A1* | 10/2019 | Ziebart | B62D 13/06 |
| 2020/0247197 | A1* | 8/2020 | Niewiadomski | B60T 8/1708 |
| 2020/0282910 | A1* | 9/2020 | Nagasamy | B60D 1/62 |
| 2021/0072364 | A1* | 3/2021 | Weinlich | B60W 40/10 |
| 2021/0291738 | A1* | 9/2021 | Lang | B60R 1/12 |
| 2022/0024391 | A1* | 1/2022 | Gali | G06T 7/73 |
| 2022/0135127 | A1* | 5/2022 | Lu | B62D 1/22 |
| | | | | 701/41 |
| 2023/0001984 | A1* | 1/2023 | Lu | B62D 15/0295 |
| 2023/0162509 | A1* | 5/2023 | DeLizo | G01B 17/00 |
| | | | | 382/103 |
| 2023/0206497 | A1* | 6/2023 | Sharma | G06T 7/73 |
| | | | | 701/33.1 |
| 2023/0415651 | A1* | 12/2023 | Couperthwaite | B60R 1/00 |
| 2024/0135606 | A1* | 4/2024 | Sharma | G06V 20/588 |

* cited by examiner

SYSTEM AND METHOD FOR ENHANCING OCCUPANT AWARENESS

INTRODUCTION

The present disclosure relates to systems and methods for increasing occupant awareness for a vehicle, and more particularly to enhancing occupant awareness when reversing a trailer.

To increase occupant awareness and convenience, vehicles may be equipped with camera systems that are configured to capture images of the environment surrounding the vehicle. The images are then displayed to the occupant within the vehicle, such that the occupant may avoid collisions during, for example, parking maneuvers. The camera system may provide several views to the occupant, allowing the occupant to observe obstructions in several areas of interest, for example, the front, sides, or rear of the vehicle. However, current camera systems may fail to provide views of additional areas of interest when the vehicle is towing a trailer.

Thus, while current camera systems and methods achieve their intended purpose, there is a need for a new and improved system and method for increasing occupant awareness for a vehicle.

SUMMARY

According to several aspects, a system for enhancing occupant awareness for a vehicle is provided. The system includes a camera system for capturing images of an environment surrounding the vehicle, a display for displaying information to the occupant of the vehicle and a controller in electrical communication with the camera system and the display. The controller is programmed to determine an activation state of the system. The activation state includes an activated state and a deactivated state. The controller is further programmed to capture an image of the environment surrounding the vehicle using the camera system in response to determining that the activation state is the activated state. The image has a first portion and a second portion, and the first portion of the image includes a trailer connected to the vehicle and the second portion of the image. The controller is further programmed to display the second portion of the image to the occupant using the display based at least in part on the first portion of the image.

In another aspect of the present disclosure, to determine the activation state of the system, the controller is further programmed to determine a towing status of the vehicle. The towing status includes a trailer connected status and a trailer disconnected status. To determine the activation state of the system, the controller is further programmed to determine a transmission shift state of the vehicle. The transmission shift state includes a forward shift state and a reverse shift state. To determine the activation state of the system, the controller is further programmed to determine a trailer angle. The trailer angle is an angle of the trailer relative to the vehicle. To determine the activation state of the system, the controller is further programmed to determine the activation state of the system to be the activated state in response to determining that the towing status is the trailer connected status, the transmission shift state is the reverse shift state, and the trailer angle is greater than or less than a predetermined trailer angle range.

In another aspect of the present disclosure, to display the second portion of the image to the occupant using the display, the controller is further programmed to display the second portion of the image on a left-hand side of the display in response to determining that the trailer angle is less than one hundred and eighty. To display the second portion of the image to the occupant using the display, the controller is further programmed to display the second portion of the image on a right-hand side of the display in response to determining that the trailer angle is greater than one hundred and eighty.

In another aspect of the present disclosure, the first portion of the image includes an area of the environment behind the vehicle. The image includes a plurality of pixels, each of the plurality of pixels having an x-coordinate and a y-coordinate.

In another aspect of the present disclosure, to display the second portion of the image to the occupant using the display, the controller is further programmed to identify a rear edge of the trailer based at least in part on the first portion of the image.

In another aspect of the present disclosure, to identify the rear edge of the trailer, the controller is further programmed to detect a set of all edges of the trailer in the first portion of the image using an edge detection algorithm. To identify the rear edge of the trailer, the controller is further programmed to determine a set of outer edges of the trailer. The set of outer edges is a subset of the set of all edges. To identify the rear edge of the trailer, the controller is further programmed to identify a first set of pixels in the first portion of the image corresponding to the rear edge of the trailer. The rear edge of the trailer is one edge of the set of outer edges. The first set of pixels includes an upper rear edge pixel and a lower rear edge pixel.

In another aspect of the present disclosure, the second portion of the image is adjacent to the rear edge of the trailer. A predetermined trailer area of the second portion of the image includes the trailer.

In another aspect of the present disclosure, the predetermined trailer area is fifteen percent of a total area of the second portion of the image.

In another aspect of the present disclosure, the second portion of the image is a rectangle defined by a plurality of corner pixels within the first portion of the image. To display the second portion of the image to the occupant using the display, the controller is further programmed to determine the x-coordinate and the y-coordinate of a first of the plurality of corner pixels. The x-coordinate of the first corner pixel is based at least in part on the x-coordinate of the upper rear edge pixel and the predetermined trailer area. The y-coordinate of the first corner pixel is greater than or equal to the y-coordinate of the upper rear edge pixel. To display the second portion of the image to the occupant using the display, the controller is further programmed to determine the x-coordinate and the y-coordinate of a second of the plurality of corner pixels. The x-coordinate of the second corner pixel is based at least in part on the x-coordinate of the lower rear edge pixel and the predetermined trailer area. The y-coordinate of the second corner pixel is less than or equal to the y-coordinate of the lower rear edge pixel.

In another aspect of the present disclosure, to display the second portion of the image to the occupant using the display, the controller is further programmed to determine the x-coordinate and the y-coordinate of a third of the plurality of corner pixels. The x-coordinate and the y-coordinate of the third corner pixel is based at least in part on an aspect ratio of the display. To display the second portion of the image to the occupant using the display, the controller is further programmed to determine the x-coordinate and the y-coordinate of a fourth of the plurality of corner pixels. The x-coordinate and the y-coordinate of the fourth corner pixel is based at least in part on an aspect ratio of the display.

According to several aspects, a method for enhancing occupant awareness for a vehicle is provided. The method includes capturing an image of an environment surrounding the vehicle using a camera system. The image has a first portion and a second portion. The first portion of the image includes a trailer connected to the vehicle and the second portion of the image. The method also includes displaying the second portion of the image to the occupant using a display based at least in part on the first portion of the image.

In another aspect of the present disclosure, the first portion of the image includes an area of the environment behind the vehicle. The first portion of the image further includes a plurality of pixels, each of the plurality of pixels having an x-coordinate and a y-coordinate.

In another aspect of the present disclosure, displaying the second portion of the image to the occupant using the display further may include identifying a rear edge of the trailer based at least in part on the first portion of the image.

In another aspect of the present disclosure, identifying the rear edge of the trailer further may include detecting a set of all edges of the trailer in the first portion of the image using an edge detection algorithm. Identifying the rear edge of the trailer further may include determining a set of outer edges of the trailer. The set of outer edges is a subset of the set of all edges. Identifying the rear edge of the trailer further may include identifying a first set of pixels in the first portion of the image corresponding to the rear edge of the trailer. The rear edge of the trailer is one edge of the set of outer edges. The first set of pixels includes an upper rear edge pixel and a lower rear edge pixel.

In another aspect of the present disclosure, the second portion of the image is adjacent to the rear edge of the trailer. A predetermined trailer area of the second portion of the image includes the trailer. The predetermined trailer area is fifteen percent of a total area of the second portion of the image.

In another aspect of the present disclosure, the second portion of the image is a rectangle defined by a plurality of corner pixels within the first portion of the image. Displaying the second portion of the image to the occupant using the display further may include determining the x-coordinate and the y-coordinate of a first of the plurality of corner pixels. The x-coordinate of the first corner pixel is based at least in part on the x-coordinate of the upper rear edge pixel and the predetermined trailer area. The y-coordinate of the first corner pixel is greater than or equal to the y-coordinate of the upper rear edge pixel. Displaying the second portion of the image to the occupant using the display further may include determining the x-coordinate and the y-coordinate of a second of the plurality of corner pixels. The x-coordinate of the second corner pixel is based at least in part on the x-coordinate of the lower rear edge pixel and the predetermined trailer area. The y-coordinate of the second corner pixel is less than or equal to the y-coordinate of the lower rear edge pixel.

In another aspect of the present disclosure, displaying the second portion of the image to the occupant using the display further may include determining the x-coordinate and the y-coordinate of a third of the plurality of corner pixels. The x-coordinate and the y-coordinate of the third corner pixel is based at least in part on an aspect ratio of the display. Displaying the second portion of the image to the occupant using the display further may include determining the x-coordinate and the y-coordinate of a fourth of the plurality of corner pixels. The x-coordinate and the y-coordinate of the fourth corner pixel is based at least in part on an aspect ratio of the display.

According to several aspects, a system for enhancing occupant awareness for a vehicle is provided. The system includes a camera system for capturing images of an environment surrounding the vehicle. The system also includes a display for displaying information to an occupant of the vehicle. The system also includes a controller in electrical communication with the camera system and the display. The controller is programmed to determine a towing status of the vehicle. The towing status includes a trailer connected status and a trailer disconnected status. The controller is further programmed to determine a transmission shift state of the vehicle. The transmission shift state includes a forward shift state and a reverse shift state. The controller is further programmed to determine a trailer angle. The trailer angle is an angle of the trailer relative to the vehicle. The controller is further programmed to capture an image of the environment surrounding the vehicle using the camera system in response to determining that the towing status is the trailer connected status, the transmission shift state is the reverse shift state, and a magnitude of the trailer angle is greater than or less than a predetermined trailer angle range. The image has a first portion and a second portion. The first portion of the image includes a trailer connected to the vehicle and the second portion of the image. The image includes a plurality of pixels, each of the plurality of pixels having an x-coordinate and a y-coordinate. The controller is further programmed to identify a rear edge of the trailer based at least in part on the first portion of the image. The controller is further programmed to display the second portion of the image to the occupant using the display based at least in part on the rear edge of the trailer in the first portion of the image.

In another aspect of the present disclosure, to identify the rear edge of the trailer, the controller is further programmed to detect a set of all edges of the trailer in the first portion of the image using an edge detection algorithm. To identify the rear edge of the trailer, the controller is further programmed to determine a set of outer edges of the trailer. The set of outer edges is a subset of the set of all edges. To identify the rear edge of the trailer, the controller is further programmed to identify a first set of pixels in the first portion of the image corresponding to the rear edge of the trailer. The rear edge of the trailer is one edge of the set of outer edges. The first set of pixels includes an upper rear edge pixel and a lower rear edge pixel.

In another aspect of the present disclosure, wherein the second portion of the image is a rectangle defined by a plurality of corner pixels within the first portion of the image. To display the second portion of the image to the occupant using the display, the controller is further programmed to determine the x-coordinate and the y-coordinate of a first of the plurality of corner pixels. The x-coordinate of the first corner pixel is based at least in part on the x-coordinate of the upper rear edge pixel and the predetermined trailer area. The y-coordinate of the first corner pixel is greater than or equal to the y-coordinate of the upper rear edge pixel. To display the second portion of the image to the occupant using the display, the controller is further programmed to determine the x-coordinate and the y-coordinate of a second of the plurality of corner pixels. The x-coordinate of the second corner pixel is based at least in part on the x-coordinate of the lower rear edge pixel and the predetermined trailer area. The y-coordinate of the second corner pixel is less than or equal to the y-coordinate of the lower rear edge pixel. To display the second portion of the image to the occupant using the display, the controller is further programmed to determine the x-coordinate and the y-coordinate of a third of the plurality of corner pixels. The x-coordinate and the y-coordinate of the third corner pixel is based at least in part on an aspect ratio of the display. To display the second portion of the image to the occupant using the display, the controller is further programmed to determine the x-coordinate and the y-coordinate of a fourth of the plurality of corner pixels. The x-coordinate and the y-coordinate of the fourth corner pixel is based at least in part on an aspect ratio of the display.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When reversing a vehicle connected to a trailer, identifying obstacles in the path of the trailer is advantageous for the awareness of the vehicle occupants. However, due to the length of the vehicle and the trailer, obstacles near the rear of the trailer may be far from vehicle cameras, and thus more challenging to identify using a backup camera system. Using the system and method of the present disclosure, the occupant of the vehicle is presented with a larger image of an area near the rear of the trailer, increasing occupant awareness and convenience.

Figure 1:
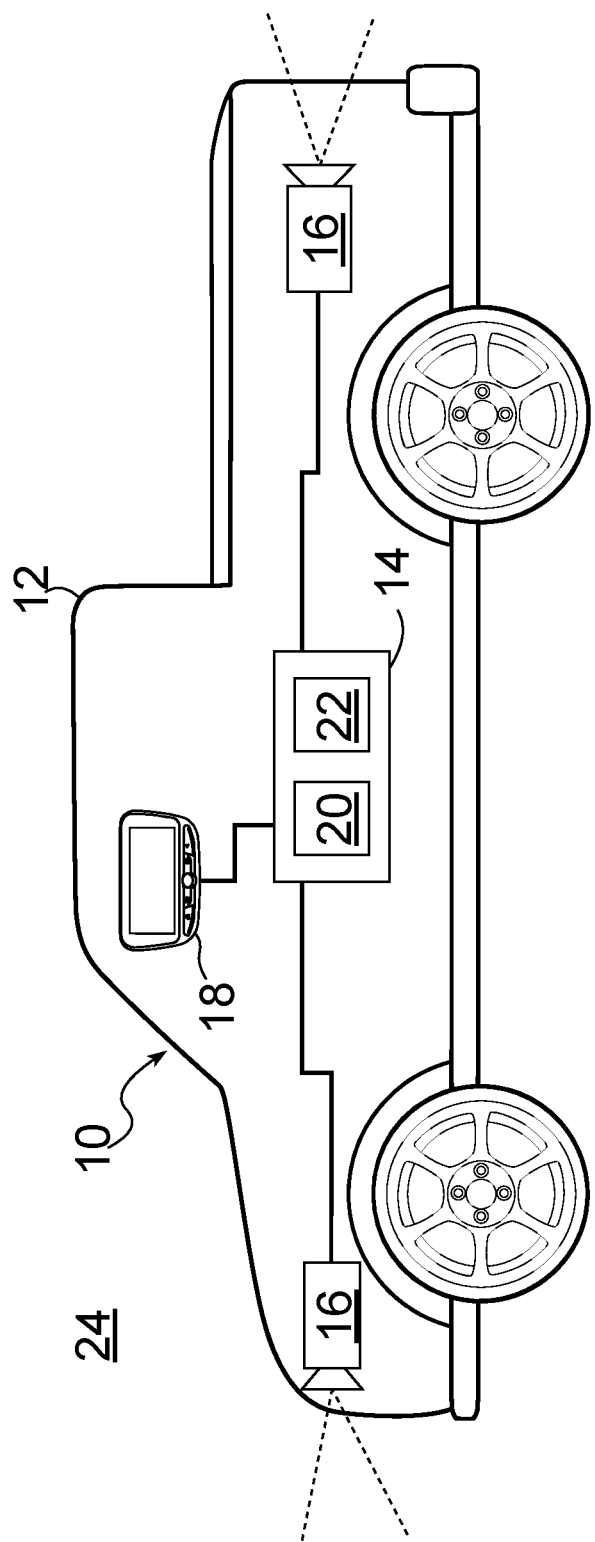
FIG. 1 is a schematic diagram of a system for enhancing occupant awareness for a vehicle according to an exemplary embodiment.

Referring to FIG. 1, a system for enhancing occupant awareness for a vehicle is illustrated and generally indicated by reference number 10. The system 10 is shown with an exemplary vehicle 12. While a utility vehicle is illustrated, it should be appreciated that the vehicle 12 may be any type of vehicle without departing from the scope of the present disclosure. The system 10 generally includes a controller 14, a camera system 16, and a display 18.

The controller 14 is used to implement a method 100 for enhancing occupant awareness for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the camera system 16 and the display 18. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The camera system 16 is used to capture images and/or videos of the environment 24 surrounding the vehicle 12. In an exemplary embodiment, the camera system 16 includes a photo and/or video camera which is positioned to view the environment 24 surrounding the vehicle 12. In a non-limiting example, the camera system 16 includes cameras affixed inside of the vehicle 12, for example, in a headliner of the vehicle 12, having a view through a windscreen of the vehicle 12. In another non-limiting example, the camera system 16 includes cameras affixed outside of the vehicle 12, for example, on a roof of the vehicle 12, having a view of the environment 24 in front of the vehicle 12.

In another exemplary embodiment, the camera system 16 is a surround view camera system including a plurality of cameras (also known as satellite cameras) arranged to provide a view of the environment 24 adjacent to all sides of the vehicle 12. In a non-limiting example, the camera system 16 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 16 further includes an additional rear-view camera mounted near a center high mounted stop lamp of the vehicle 12.

It should be understood that camera systems having a different number of cameras and/or different mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The display 18 is used to provide information to an occupant of the vehicle 12. In the scope of the present disclosure, the occupant includes a driver and/or a passenger of the vehicle 12. In the exemplary embodiment depicted in FIG. 1, the display 18 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 18 is disposed in a rearview mirror are also within the scope of the present disclosure. In another exemplary embodiment, the display 18 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the display 18 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the display 18 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure.

Figure 2:
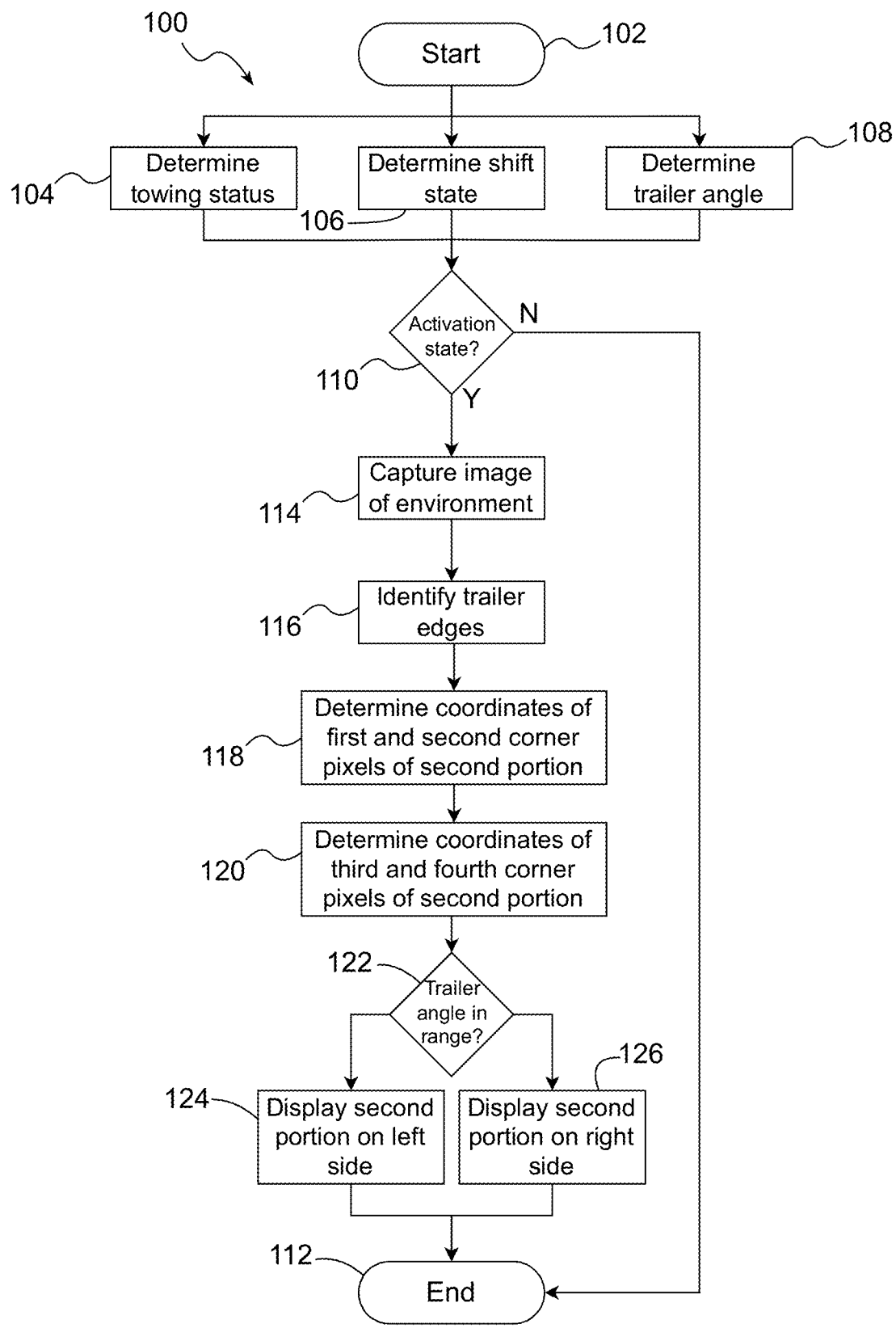
FIG. 2 is a flowchart of a method for enhancing occupant awareness for a vehicle according to an exemplary embodiment.
Figure 3:
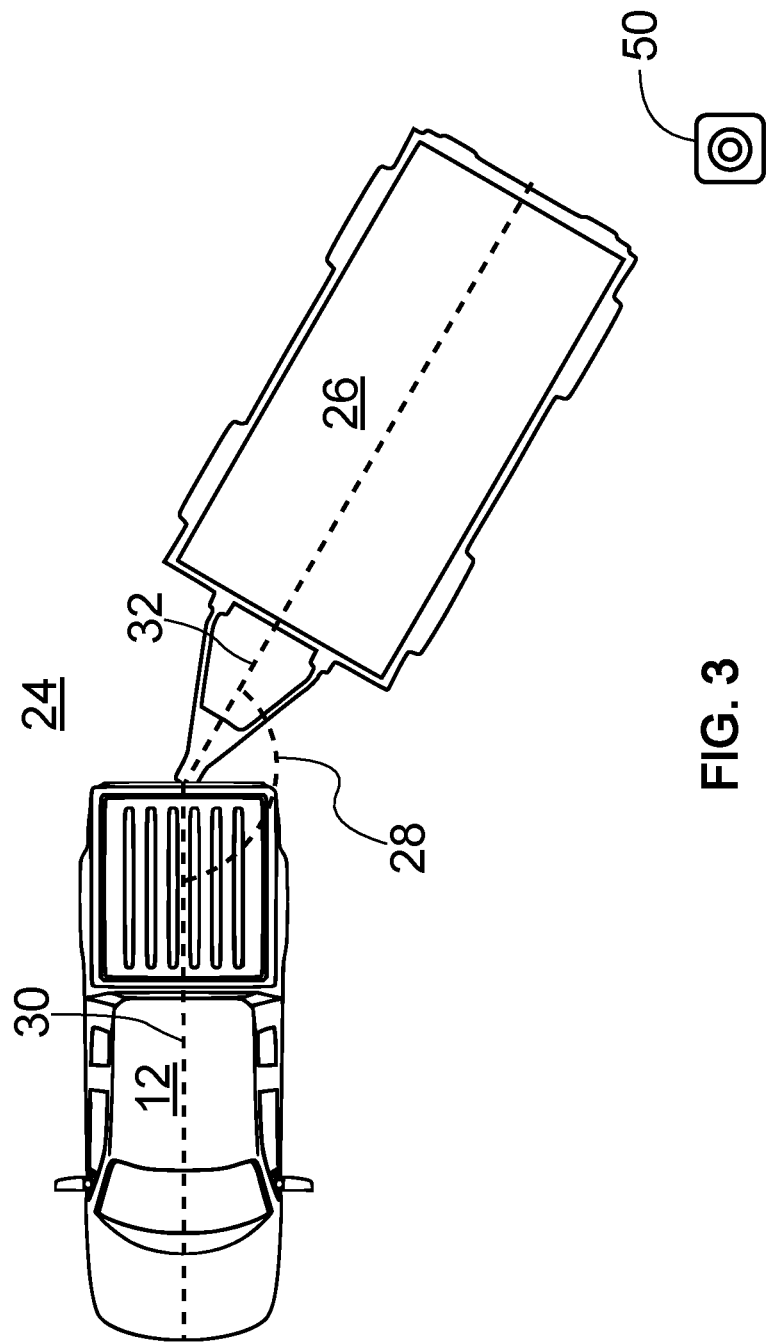
FIG. 3 is a schematic diagram of a vehicle connected to a trailer according to an exemplary embodiment.

Referring to FIG. 2, a flowchart of the method 100 for enhancing occupant awareness for a vehicle is shown. Referring further to FIG. 3, a schematic diagram of the vehicle 12 connected to a trailer 26 is shown. The method 100 begins at block 102 and proceeds to blocks 104, 106, and 108 to determine an activation state. At block 104, the controller 14 determines a towing status of the vehicle 12. In the scope of the present disclosure, the towing status of the vehicle 12 defines whether the trailer 26 is currently connected to the vehicle 12. If the trailer 26 is currently connected to the vehicle 12, the towing status is a trailer connected status. If the trailer 26 is not currently connected to the vehicle 12, the towing status is a trailer disconnected status. In an exemplary embodiment, to determine the towing status of the vehicle 12, the controller 14 determines whether an electrical connection is present between the vehicle 12 and the trailer 26. In another exemplary embodiment, the controller 14 uses the display 18 to prompt the occupant for the towing status of the vehicle 12. After block 104, the method 100 proceeds to block 110.

At block 106, the controller 14 determines a transmission shift state of the vehicle 12. In an exemplary embodiment, the transmission shift state includes a forward shift state and a reverse shift state. In the forward shift state, a transmission (not shown) of the vehicle 12 is configured to allow the vehicle 12 to be driven forward by a drive motor (e.g., an internal combustion engine and/or an electric motor) of the vehicle 12. In the reverse shift state, the transmission of the vehicle 12 is configured to allow the vehicle 12 to be driven backward by the drive motor of the vehicle 12. In an exemplary embodiment, to determine the transmission shift state, the controller 14 receives a signal from the transmission (e.g., from a transmission controller) of the vehicle 12 to indicate the transmission shift state. After block 106, the method 100 proceeds to block 110.

Referring again to FIG. 3 with continued reference to FIG. 2, at block 108, the controller 14 determines a trailer angle 28 of the trailer 26. In the scope of the present disclosure, the trailer angle 28 is defined as an angle between a vehicle centerline 30 and a trailer centerline 32, as measured from a left-hand side (or driver side) of the vehicle 12. For example, if the trailer 26 is exactly aligned with the vehicle 12, the trailer angle 28 is equal to 180°. In another example, if the trailer 26 is angled toward the left-hand side of the vehicle 12, the trailer angle 28 is less than 180° (as shown in FIG. 3). In yet another example, if the trailer 26 is angled toward a right-hand side (or passenger side) of the vehicle 12, the trailer angle 28 is greater than 180°. In an exemplary embodiment, to determine the trailer angle 28, the controller 14 uses the camera system 16 and an image processing algorithm to determine the trailer angle 28. In another exemplary embodiment, the controller 14 uses an angle sensing device (e.g., a rotary encoder) disposed at a mounting point between the vehicle 12 and the trailer 26 to determine the trailer angle 28. After block 108, the method 100 proceeds to block 110.

At block 110, the controller 14 determines the activation state based on the towing status determined at block 104, the transmission shift state determined at block 106, and the trailer angle 28 determined at block 108. The activation state is determined to be an activated state if the towing status determined at block 104 is the trailer connected status, the transmission shift state determined at block 106 is the reverse shift state, and the trailer angle 28 determined at block 108 is greater than or less than a predetermined trailer angle range. The purpose of the predetermined trailer angle range is to ensure that the trailer 26 is sufficiently within a field-of-view of the camera system 16. In a non-limiting example, the predetermined trailer angle range includes any trailer angle 28 between 190° and 170°. Therefore, the trailer 26 is not sufficiently within the field-of-view of the camera system 16 if the trailer angle 28 is between 190° and 170°. It should be understood that the trailer angle range may be configurable by the occupant of the vehicle 12 using, for example, the display 18. The activation state is determined to be a deactivated state if the towing status determined at block 104 is the trailer disconnected status, the transmission shift state determined at block 106 is the forward shift state, or the trailer angle 28 determined at block 108 is inside of the predetermined trailer angle range.

If the activation state is determined to be the deactivated state at block 110, the method 100 proceeds to enter a standby state at block 112. If the activation state is determined to be the activated state at block 110, the method 100 proceeds to block 114.

Figure 4:
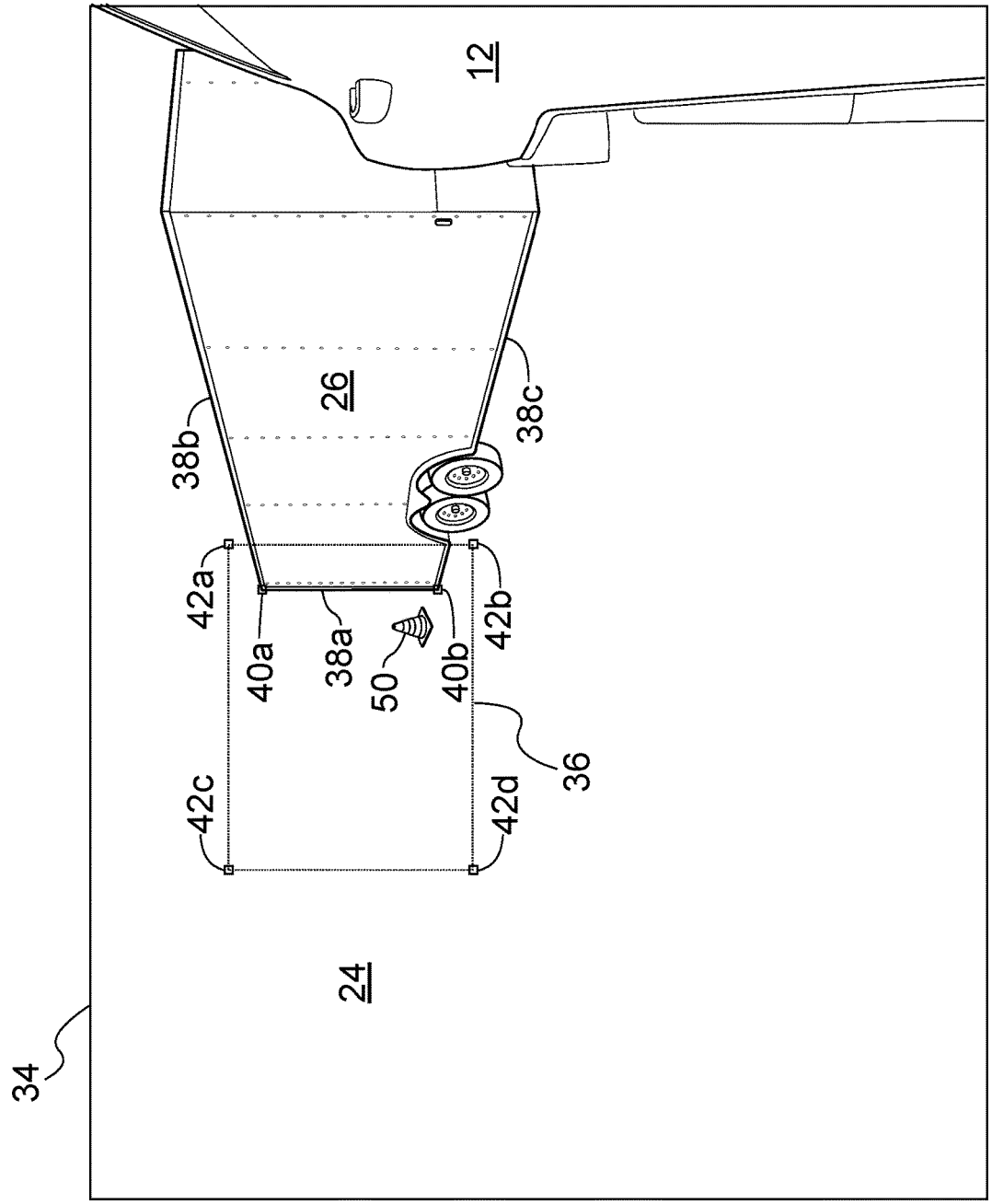
FIG. 4 is an exemplary image of an environment surrounding a vehicle including a first portion and a second portion according to an exemplary embodiment.
Figure 5:
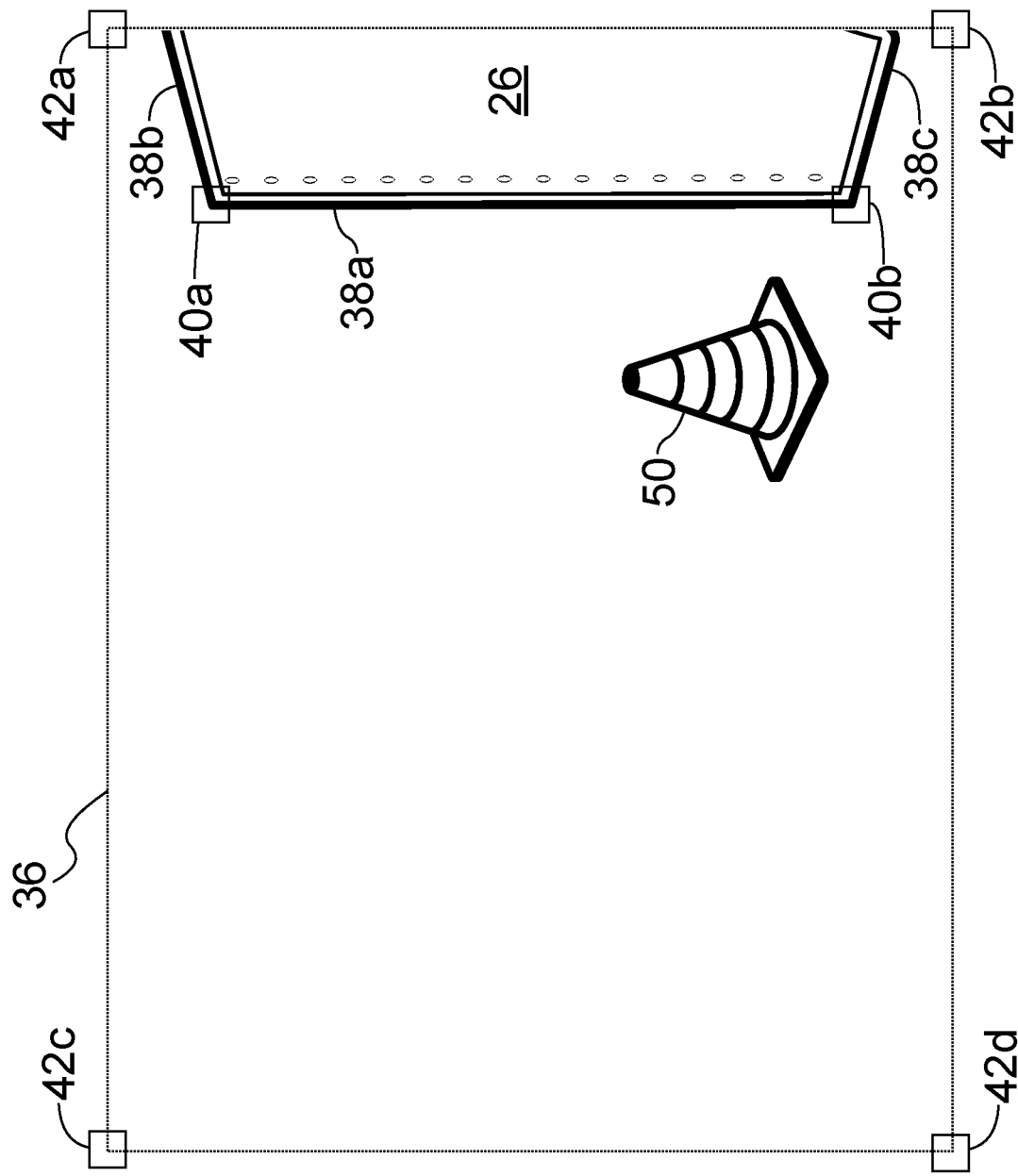
FIG. 5 is a magnified view of the second portion of the exemplary image of FIG. 4 according to an exemplary embodiment.

At block 114, the controller 14 captures an image of the environment 24 surrounding the vehicle 12 using the camera system 16. Referring to FIG. 4, an exemplary image of the environment 24 surrounding the vehicle 12 is shown. It should be understood that the image of the environment 24 is made up of a plurality of pixels, each of the plurality of pixels having an x-coordinate and a y-coordinate within the image. Each of the plurality of pixels may also include further information (e.g., color information) to define the image. In an exemplary embodiment, the image has a first portion 34 and a second portion 36. Referring to FIG. 5, a magnified view of the second portion 36 is shown. The first portion 34 includes an area of the environment 24 behind the vehicle 12 including the trailer 26 connected to the vehicle 12. The first portion 34 further includes the second portion 36, as shown in FIG. 4. The second portion 36 will be discussed in further detail below. After block 114, the method 100 proceeds to block 116.

At block 116, the controller 14 identifies edges of the trailer 26 in the first portion 34 of the image captured at block 114. In an exemplary embodiment, the controller 14 identifies a set of all edges of the trailer 26. The set of all edges of the trailer 26 may include inner edges and outer edges. Outer edges are those edges which define an outer boundary of the trailer 26. Inner edges are those edges which are within the outer boundary of the trailer 26. In a non-limiting example, the outer edges include a rear edge 38a, a top edge 38b, and a bottom edge 38c. As discussed above, the image is made up of a plurality of pixels. Therefore, the rear edge 38a is identified by a first set of pixels in the first portion 34 of the image. The top edge 38b is identified by a second set of pixels in the first portion 34 of the image. The bottom edge 38c is identified by a third set of pixels in the first portion 34 of the image. The first set of pixels corresponding to the rear edge 38a includes an upper edge pixel 40a and a lower edge pixel 40b. The upper edge pixel 40a is the one of the first set of pixels having a largest y-coordinate and is located at an intersection of the rear edge 38a and the top edge 38b. The lower edge pixel 40b is the one of the first set of pixels having a smallest y-coordinate and is located at an intersection of the rear edge 38a and the bottom edge 38c.

To identify edges of the trailer 26 at block 116, the controller 14 uses an edge detection algorithm to identify the edges. In an exemplary embodiment, the edge detection algorithm is a machine learning algorithm. The machine learning algorithm is trained with a plurality of images of trailers with pre-identified edges. After sufficient training of the machine learning algorithm, the algorithm can identify edges of trailers in images with a high accuracy and precision. In another exemplary embodiment, the edge detection algorithm is a Canny edge detection algorithm (as discussed in the following publication, the entire contents of which is hereby incorporated by reference: Canny, J., A Computational Approach To Edge Detection, IEEE Transactions on Pattern Analysis and Machine Intelligence, 8(6):679-698, 1986.) In yet another exemplary embodiment, the edge detection algorithm further includes performing a Hough Transform to detect line targets in the image (as discussed in U.S. Pat. No. 3,069,654A, the entire contents of which is hereby incorporated by reference). It should be understood that any method for identifying edges in an image may be used by the controller 14 at block 116 without departing from the scope of the present disclosure. After block 116, the method 100 proceeds to block 118.

Referring again to FIGS. 4 and 5 with continued reference to FIG. 2, the second portion 36 is a rectangle defined by a first corner pixel 42a, a second corner pixel 42b, a third corner pixel 42c and a fourth corner pixel 42d. At block 118, the controller 14 determines the x-coordinate and y-coordinate of the first corner pixel 42a and the second corner pixel 42b that define the second portion 36. The y-coordinate of the first corner pixel 42a is determined to be greater than the y-coordinate of the upper edge pixel 40a by a predetermined threshold (e.g., twenty pixels greater than the y-coordinate of the upper edge pixel 40a). The y-coordinate of the second corner pixel 42b is determined to be less than the y-coordinate of the lower edge pixel 40b by a predetermined threshold (e.g., twenty pixels less than the y-coordinate of the lower edge pixel 40b).

Therefore, a height of the second portion 36 is a difference between the y-coordinate of the first corner pixel 42a and the y-coordinate of the second corner pixel 42b. An aspect ratio of the second portion 36 (i.e., a ratio of a width of the second portion 36 to the height of the second portion 36) is equal to an aspect ratio of the display 18 (e.g., 16:10). Thus, based on the height of the second portion 36 and the aspect ratio of the display 18, the width of the second portion 36 may be determined. Furthermore, based on the width and the height of the second portion 36, a total area of the second portion 36 may be determined.

The x-coordinates of the first corner pixel 42a and the second corner pixel 42b are determined based on the x-coordinates of the upper edge pixel 40a and the lower edge pixel 40b of the trailer 26 determined at block 116. In an exemplary embodiment, the x-coordinates of the first corner pixel 42a and the x-coordinate of the second corner pixel 42b are equal. The x-coordinate of the first corner pixel 42a and the x-coordinate of the second corner pixel 42b is determined such that a predetermined trailer area of the second portion 36 is occupied by the trailer 26. In a non-limiting example, the predetermined trailer area is fifteen percent of the total area of the second portion 36. Therefore, the second portion 36 includes a view of the rear edge 38a of the trailer 26, such that the occupant may identify obstacles in a path of the trailer 26 while reversing the vehicle 12 and the trailer 26. After block 118, the method 100 proceeds to block 120.

At block 120, the controller 14 determines the x-coordinate and y-coordinate of the third corner pixel 42c and the fourth corner pixel 42d which define the second portion 36. In an exemplary embodiment, the y-coordinate of the third corner pixel 42c is equal to the y-coordinate of the first corner pixel 42a. The y-coordinate of the fourth corner pixel 42d is equal to the y-coordinate of the second corner pixel 42b. The x-coordinate of the third corner pixel 42c is determined based on the width of the second portion 36, which is determined based on the height of the second portion 36 and the aspect ratio of the display 18, as discussed above. The x-coordinate of the fourth corner pixel 42d is equal to the x-coordinate of the third corner pixel 42c. After block 120, the method 100 proceeds to block 122.

At block 122, the controller 14 compares the trailer angle 28 determined at block 108 to 180°. If the trailer angle 28 is less than 180°, the method 100 proceeds to block 124. If the trailer angle 28 is greater than 180°, the method 100 proceeds to block 126.

At block 124, the second portion 36 is displayed on a left-hand side of the display 18, providing the occupant with a magnified view of the second portion 36. After block 124, the method 100 proceeds to enter the standby state at block 112.

At block 126, the second portion 36 is displayed on a right-hand side of the display 18, providing the occupant with a magnified view of the second portion 36. After block 126, the method 100 proceeds to enter the standby state at block 112.

Figure 6:
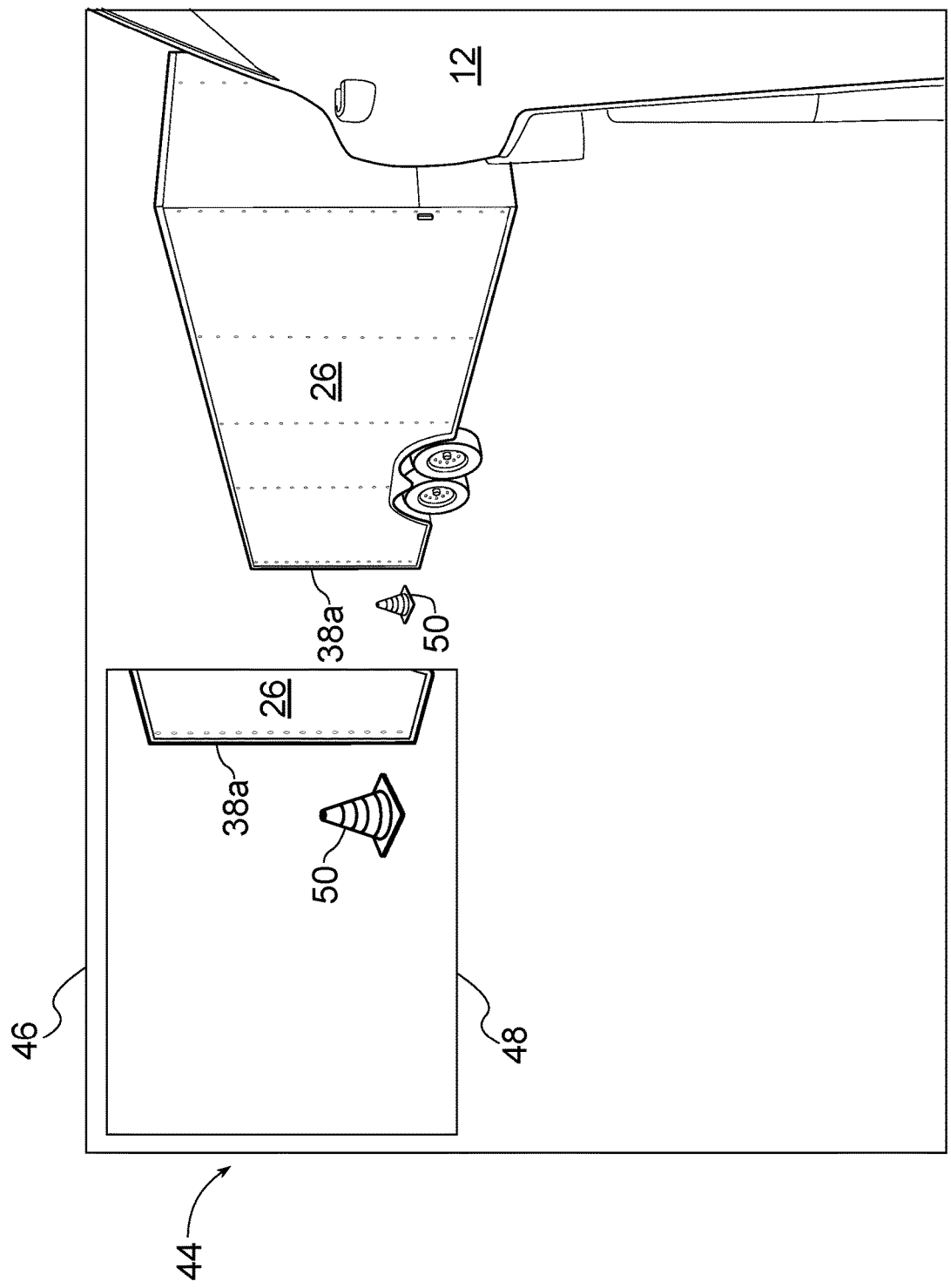
FIG. 6 is an exemplary view to be displayed using a display of a vehicle according to an exemplary embodiment.

Referring to FIG. 6, an exemplary view 44 to be displayed using the display 18 at block 124 is shown. The exemplary view 44 includes a first viewport 46 which occupies the entire display 18 and displays the first portion 34. The exemplary view 44 further includes a second viewport 48 overlayed on the first viewport 46 which displays the second portion 36, as defined by the corner pixels 42a, 42b, 42c, 42d determined at blocks 118 and 120. An exemplary obstacle 50 (e.g., a traffic cone) is shown to illustrate that the system 10 and method 100 provide an advantage by, for example, increasing occupant awareness to obstacles in the environment 24. It should be understood that a similar exemplary view may be produced which shows the second viewport 48 overlayed on the right-hand side of the display 18 as discussed in reference to block 126.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for enhancing occupant awareness for a vehicle, the system comprising:
    a camera system for capturing images of an environment surrounding the vehicle;
    a display for displaying information to an occupant of the vehicle;
    a controller in electrical communication with the camera system and the display, wherein the controller is programmed to:
        determine an activation state of the system, wherein the activation state includes an activated state and a deactivated state;
        capture an image of the environment surrounding the vehicle using the camera system in response to determining that the activation state is the activated state, wherein the image includes a plurality of pixels, each of the plurality of pixels having an x-coordinate and a y-coordinate, wherein the image has a first portion and a second portion, wherein the first portion of the image includes a trailer connected to the vehicle in an area of the environment behind the vehicle and the second portion of the image, wherein the second portion of the image is adjacent to a rear edge of the trailer, wherein a predetermined trailer area of the second portion of the image includes the trailer, and wherein the second portion of the image is a rectangle defined by a plurality of corner pixels within the first portion of the image; and
        display the second portion of the image to the occupant using the display based at least in part on the first portion of the image, wherein to display the second portion of the image to the occupant using the display, the controller is programmed to:
            detect a set of all edges of the trailer in the first portion of the image using an edge detection algorithm;
            determine a set of outer edges of the trailer, wherein the set of outer edges is a subset of the set of all edges;
            identify a first set of pixels in the first portion of the image corresponding to the rear edge of the trailer, wherein the rear edge of the trailer is one edge of the set of outer edges, and wherein the first set of pixels includes an upper rear edge pixel and a lower rear edge pixel;
            determine the x-coordinate and the y-coordinate of a first of the plurality of corner pixels, wherein the x-coordinate of the first corner pixel is based at least in part on the x-coordinate of the upper rear edge pixel and the predetermined trailer area, and wherein the y-coordinate of the first corner pixel is greater than or equal to the y-coordinate of the upper rear edge pixel; and
            determine the x-coordinate and the y-coordinate of a second of the plurality of corner pixels, wherein the x-coordinate of the second corner pixel is based at least in part on the x-coordinate of the lower rear edge pixel and the predetermined trailer area, and wherein the y-coordinate of the second corner pixel is less than or equal to the y-coordinate of the lower rear edge pixel.

2. The system of claim 1, wherein to determine the activation state of the system, the controller is further programmed to:
    determine a towing status of the vehicle, wherein the towing status includes a trailer connected status and a trailer disconnected status;
    determine a transmission shift state of the vehicle, wherein the transmission shift state includes a forward shift state and a reverse shift state;
    determine a trailer angle, wherein the trailer angle is an angle of the trailer relative to the vehicle; and
    determine the activation state of the system to be the activated state in response to determining that the towing status is the trailer connected status, the transmission shift state is the reverse shift state, and the trailer angle is greater than or less than a predetermined trailer angle range.

3. The system of claim 2, wherein to display the second portion of the image to the occupant using the display, the controller is further programmed to:
    display the second portion of the image on a left-hand side of the display in response to determining that the trailer angle is less than one hundred and eighty; and
    display the second portion of the image on a right-hand side of the display in response to determining that the trailer angle is greater than one hundred and eighty.

4. The system of claim 2, wherein to determine the towing status of the vehicle, the controller is further programmed to:
    detect an electrical connection between the vehicle and the trailer; and
    determine the towing status of the vehicle to be the trailer connected status in response to detecting the electrical connection between the vehicle and the trailer.

5. The system of claim 2, wherein to determine the trailer angle, the controller is further programmed to:
    determine the trailer angle using an image processing algorithm based at least in part on the image of the environment surrounding the vehicle.

6. The system of claim 2, wherein the predetermined trailer angle range includes any trailer angle between one hundred and ninety and one hundred and seventy.

7. The system of claim 1, wherein the predetermined trailer area is fifteen percent of a total area of the second portion of the image.

8. The system of claim 1, wherein to display the second portion of the image to the occupant using the display, the controller is further programmed to:
    determine the x-coordinate and the y-coordinate of a third of the plurality of corner pixels, wherein the x-coordinate and the y-coordinate of the third corner pixel is based at least in part on an aspect ratio of the display; and
    determine the x-coordinate and the y-coordinate of a fourth of the plurality of corner pixels, wherein the x-coordinate and the y-coordinate of the fourth corner pixel is based at least in part on an aspect ratio of the display.

9. The system of claim 8, wherein an aspect ratio of the second portion is equal to the aspect ratio of the display.

10. The system of claim 1, wherein the camera system is a surround view camera system configured to provide a view of the environment adjacent to all sides of the vehicle.

11. A method for enhancing occupant awareness for a vehicle, the method comprising:
- capturing an image of an environment surrounding the vehicle using a camera system, wherein the image has a first portion and a second portion, wherein the first portion of the image includes a trailer connected to the vehicle and the second portion of the image, wherein the first portion of the image includes an area of the environment behind the vehicle, wherein the first portion of the image includes a plurality of pixels, each of the plurality of pixels having an x-coordinate and a y-coordinate, wherein the second portion of the image is adjacent to a rear edge of the trailer, wherein a predetermined trailer area of the second portion of the image includes the trailer, and wherein the predetermined trailer area is fifteen percent of a total area of the second portion of the image;
- detecting a set of all edges of the trailer in the first portion of the image using an edge detection algorithm;
- determining a set of outer edges of the trailer, wherein the set of outer edges is a subset of the set of all edges;
- identifying a first set of pixels in the first portion of the image corresponding to a rear edge of the trailer, wherein the rear edge of the trailer is one edge of the set of outer edges, and wherein the first set of pixels includes an upper rear edge pixel and a lower rear edge pixel; and
- displaying the second portion of the image to an occupant using a display based at least in part on the first portion of the image, wherein the second portion of the image is a rectangle defined by a plurality of corner pixels within the first portion of the image, and wherein displaying the second portion of the image to the occupant using the display further comprises:
  - determining the x-coordinate and the y-coordinate of a first of the plurality of corner pixels, wherein the x-coordinate of the first corner pixel is based at least in part on the x-coordinate of the upper rear edge pixel and the predetermined trailer area, and wherein the y-coordinate of the first corner pixel is greater than or equal to the y-coordinate of the upper rear edge pixel; and
  - determining the x-coordinate and the y-coordinate of a second of the plurality of corner pixels, wherein the x-coordinate of the second corner pixel is based at least in part on the x-coordinate of the lower rear edge pixel and the predetermined trailer area, and wherein the y-coordinate of the second corner pixel is less than or equal to the y-coordinate of the lower rear edge pixel.

12. The method of claim 11, wherein displaying the second portion of the image to the occupant using the display further comprises:
- determining the x-coordinate and the y-coordinate of a third of the plurality of corner pixels, wherein the x-coordinate and the y-coordinate of the third corner pixel is based at least in part on an aspect ratio of the display; and
- determining the x-coordinate and the y-coordinate of a fourth of the plurality of corner pixels, wherein the x-coordinate and the y-coordinate of the fourth corner pixel is based at least in part on an aspect ratio of the display.

13. The method of claim 11, wherein displaying the second portion of the image to the occupant further comprises:
- determining a towing status of the vehicle, wherein the towing status includes a trailer connected status and a trailer disconnected status;
- determining a transmission shift state of the vehicle, wherein the transmission shift state includes a forward shift state and a reverse shift state;
- determining a trailer angle, wherein the trailer angle is an angle of the trailer relative to the vehicle; and
- displaying the second portion of the image to the occupant in response to determining that the towing status is the trailer connected status, the transmission shift state is the reverse shift state, and the trailer angle is greater than or less than a predetermined trailer angle range.

14. The method of claim 13, wherein determining the towing status of the vehicle further comprises:
- detecting an electrical connection between the vehicle and the trailer; and
- determining the towing status of the vehicle to be the trailer connected status in response to detecting the electrical connection between the vehicle and the trailer.

15. The method of claim 13, wherein determining the trailer angle further comprises:
- determining the trailer angle using an image processing algorithm based at least in part on the image of the environment surrounding the vehicle.

16. The method of claim 13, wherein displaying the second portion of the image to the occupant further comprises:
- comparing the trailer angle to the predetermined trailer angle range, wherein the predetermined trailer angle range includes any trailer angle between one hundred and ninety and one hundred and seventy.

17. The method of claim 13, wherein displaying the second portion of the image to the occupant using the display further comprises:
- displaying the second portion of the image on a left-hand side of the display in response to determining that the trailer angle is less than one hundred and eighty; and
- displaying the second portion of the image on a right-hand side of the display in response to determining that the trailer angle is greater than one hundred and eighty.

18. A system for enhancing occupant awareness for a vehicle, the system comprising:
- a camera system for capturing images of an environment surrounding the vehicle;
- a display for displaying information to an occupant of the vehicle; and
- a controller in electrical communication with the camera system and the display, wherein the controller is programmed to:
  - determine a towing status of the vehicle, wherein the towing status includes a trailer connected status and a trailer disconnected status;
  - determine a transmission shift state of the vehicle, wherein the transmission shift state includes a forward shift state and a reverse shift state;
  - determine a trailer angle, wherein the trailer angle is an angle of a trailer relative to the vehicle;
  - capture an image of the environment surrounding the vehicle using the camera system in response to determining that the towing status is the trailer connected status, the transmission shift state is the reverse shift state, and a magnitude of the trailer angle is greater than or less than a predetermined trailer angle range, wherein the image has a first portion and a second portion, and wherein the first portion of the image includes a trailer connected to the vehicle and the second portion of the image, and wherein the image includes a plurality of pixels, each of the plurality of pixels having an x-coordinate and a y-coordinate;

detect a set of all edges of the trailer in the first portion of the image using an edge detection algorithm;

determine a set of outer edges of the trailer, wherein the set of outer edges is a subset of the set of all edges; and identify a first set of pixels in the first portion of the image corresponding to a rear edge of the trailer, wherein the rear edge of the trailer is one edge of the set of outer edges, and wherein the first set of pixels includes an upper rear edge pixel and a lower rear edge pixel; and display the second portion of the image to the occupant using the display based at least in part on the rear edge of the trailer in the first portion of the image, wherein the second portion of the image is a rectangle defined by a plurality of corner pixels within the first portion of the image, and wherein to display the second portion of the image to the occupant using the display, the controller is further programmed to:

determine the x-coordinate and the y-coordinate of a first of the plurality of corner pixels, wherein the x-coordinate of the first corner pixel is based at least in part on the x-coordinate of the upper rear edge pixel and a predetermined trailer area, and wherein the y-coordinate of the first corner pixel is greater than or equal to the y-coordinate of the upper rear edge pixel;

determine the x-coordinate and the y-coordinate of a second of the plurality of corner pixels, wherein the x-coordinate of the second corner pixel is based at least in part on the x-coordinate of the lower rear edge pixel and the predetermined trailer area, and wherein the y-coordinate of the second corner pixel is less than or equal to the y-coordinate of the lower rear edge pixel;

determine the x-coordinate and the y-coordinate of a third of the plurality of corner pixels, wherein the x-coordinate and the y-coordinate of the third corner pixel is based at least in part on an aspect ratio of the display; and determine the x-coordinate and the y-coordinate of a fourth of the plurality of corner pixels, wherein the x-coordinate and the y-coordinate of the fourth corner pixel is based at least in part on an aspect ratio of the display.

19. The system of claim 18, wherein the camera system is a surround view camera system configured to provide a view of the environment adjacent to all sides of the vehicle.

20. The system of claim 19, wherein to determine the towing status of the vehicle, the controller is further programmed to:

detect an electrical connection between the vehicle and the trailer; and determine the towing status of the vehicle to be the trailer connected status in response to detecting the electrical connection between the vehicle and the trailer.

* * * * *